(12) United States Patent
Murao et al.

(10) Patent No.: US 9,599,832 B2
(45) Date of Patent: Mar. 21, 2017

(54) STEREOSCOPIC DISPLAY DEVICE

(71) Applicant: Sharp Kabushiki Kaisha, Osaka-shi, Osaka (JP)

(72) Inventors: Takehiro Murao, Osaka (JP); Ryoh Kikuchi, Osaka (JP); Takuto Yoshino, Osaka (JP); Hiroshi Fukushima, Osaka (JP); Tomoo Takatani, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 72 days.

(21) Appl. No.: 14/368,830

(22) PCT Filed: Dec. 21, 2012

(86) PCT No.: PCT/JP2012/083232
§ 371 (c)(1),
(2) Date: Jun. 26, 2014

(87) PCT Pub. No.: WO2013/099793
PCT Pub. Date: Jul. 4, 2013

(65) Prior Publication Data
US 2014/0375914 A1    Dec. 25, 2014

(30) Foreign Application Priority Data

Dec. 28, 2011  (JP) ................................. 2011-289298

(51) Int. Cl.
*G02F 1/1335* (2006.01)
*G02B 27/26* (2006.01)
*H04N 13/04* (2006.01)

(52) U.S. Cl.
CPC ....... *G02B 27/26* (2013.01); *G02F 1/133528* (2013.01); *G02F 1/133536* (2013.01);
(Continued)

(58) Field of Classification Search
CPC ............... G02B 27/26; G02F 1/133528; G02F 1/133536; G02F 2001/133531; H04N 13/0409; H04N 13/0452
(Continued)

(56) References Cited

U.S. PATENT DOCUMENTS

2004/0100598 A1    5/2004  Adachi et al.
2011/0043715 A1*   2/2011  Ohyama ............ G02B 27/2214
                                                  349/15
(Continued)

FOREIGN PATENT DOCUMENTS

JP          3419766 B2    6/2003

OTHER PUBLICATIONS

Official Communication issued in International Patent Application No. PCT/JP2012/083232, mailed on Jan. 29, 2013.

*Primary Examiner* — Charles Chang
(74) *Attorney, Agent, or Firm* — Keating & Bennett, LLP

(57) ABSTRACT

The objective is to provide a stereoscopic display device that can be switched among 2D display mode, 3D display mode and mirror mode. The device includes: a display panel (12); a switch liquid crystal panel (14); an absorptive polarizer (16); and a reflective polarizer (22). The switch liquid crystal panel (14) is located closer to the viewer than the display panel (12) is. The absorptive polarizer (16) is located closer to the viewer than the switch liquid crystal panel (14) is. The reflective polarizer (22) is located between the display panel (12) and the switch liquid crystal panel (14). The reflective polarizer (22) has a transmission axis (L6) perpendicular to the transmission axis (L3) of the absorptive polarizer (16) and passes those components of light entering the reflective polarizer (22) that are parallel to the transmission axis (L6) while reflecting those components that are perpendicular to the transmission axis (L6).

7 Claims, 13 Drawing Sheets

(52) U.S. Cl.
CPC ..... *H04N 13/0409* (2013.01); *H04N 13/0452* (2013.01); *G02F 2001/133531* (2013.01)

(58) Field of Classification Search
USPC .......................................................... 349/15
See application file for complete search history.

(56) References Cited

U.S. PATENT DOCUMENTS

| | | | | |
|---|---|---|---|---|
| 2012/0069063 A1* | 3/2012 | Sato | ................... | H04N 13/0452 345/690 |
| 2012/0105771 A1* | 5/2012 | Oka | ................... | G02F 1/133536 349/67 |
| 2013/0335648 A1* | 12/2013 | Kuroda | ................... | G09G 3/003 349/15 |

* cited by examiner

US 9,599,832 B2

STEREOSCOPIC DISPLAY DEVICE

TECHNICAL FIELD

The present invention relates to a stereoscopic display device with a switch liquid crystal panel, and more particularly, to a stereoscopic display device with a mirror capability.

BACKGROUND ART

There is a growing need for display devices with various additional values. One example is a stereoscopic display device that allows the viewer to see stereoscopic video without special glasses. One known scheme for realizing this uses a parallax barrier.

A parallax barrier based stereoscopic display device may include, for example, a display panel and a switch liquid crystal panel, where the display panel displays a stereoscopic image and the switch liquid crystal panel forms a parallax barrier that divides the stereoscopic image into sub-images. The parallax barrier includes apertures that pass light and light-shielding portions that block light. In the parallax barrier, apertures and light-shielding portions are arranged alternately.

Such a parallax barrier based stereoscopic display device with a switch liquid crystal panel may include a mirror capability for the display screen of the display device as a further additional value.

Japanese Patent No. 3419766 discloses a display device with a mirror capability. This display device may be switched between 2D image display mode and mirror mode; however, it is not capable of realizing 3D display.

Disclosure of the Invention

An object of the present invention is to provide a stereoscopic display device that can be switched among 2D display mode, 3D display mode and mirror mode.

A stereoscopic display device of the present invention includes: a display panel; a switch liquid crystal panel located closer to a viewer than the display panel is; an absorptive polarizer located closer to the viewer than the switch liquid crystal panel is; and a reflective polarizer located between the display panel and the switch liquid crystal panel, wherein the display panel is capable of selectively displaying a planar image and a stereoscopic image, the switch liquid crystal panel is capable of forming a parallax barrier having transparent portions and light-shielding portions arranged alternately, the absorptive polarizer is capable of passing those components of light entering the absorptive polarizer that are parallel to a transmission axis of the absorptive polarizer while absorbing those components that are perpendicular to the transmission axis of the absorptive polarizer, the reflective polarizer has a transmission axis perpendicular to the transmission axis of the absorptive polarizer and is capable of passing those components of light entering the reflective polarizer that are parallel to the transmission axis of the reflective polarizer while reflecting those components that are perpendicular to the transmission axis of the reflective polarizer, and the switch liquid crystal panel includes: a pair of substrates; a liquid crystal layer enclosed between the substrates; a common electrode provided on one of the substrates; a plurality of first driving electrodes provided on the other one of the substrates for working together with the common electrode to form the light-shielding portions when a voltage is applied; and a plurality of first auxiliary electrodes provided on the other one of the substrates, the first driving electrodes and the first auxiliary electrodes being arranged alternately.

The stereoscopic display device of the present invention can be switched among 2D display mode, 3D display mode and mirror mode.

EMBODIMENTS FOR CARRYING OUT THE INVENTION

Figure 1:
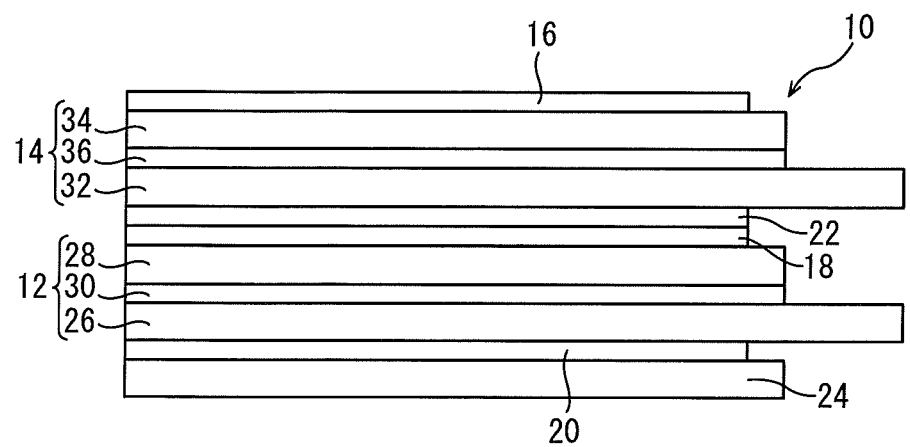
FIG. 1 is a schematic view of an example of a stereoscopic display device of a first embodiment of the present invention.

A stereoscopic display device according to an embodiment of the present invention includes: a display panel; a switch liquid crystal panel located closer to a viewer than the display panel is; an absorptive polarizer located closer to the viewer than the switch liquid crystal panel is; and a reflective polarizer located between the display panel and the switch liquid crystal panel, wherein the display panel is capable of selectively displaying a planar image and a stereoscopic image, the switch liquid crystal panel is capable of forming a parallax barrier having transparent portions and light-shielding portions arranged alternately, the absorptive polarizer is capable of passing those components of light entering the absorptive polarizer that are parallel to a transmission axis of the absorptive polarizer while absorbing those components that are perpendicular to the transmission axis of the absorptive polarizer, the reflective polarizer has a transmission axis perpendicular to the transmission axis of the absorptive polarizer and is capable of passing those components of light entering the reflective polarizer that are parallel to the transmission axis of the reflective polarizer while reflecting those components that are perpendicular to the transmission axis of the reflective polarizer, and the switch liquid crystal panel includes: a pair of substrates; a liquid crystal layer enclosed between the substrates; a common electrode provided on one of the substrates; a plurality of first driving electrodes provided on the other one of the substrates for working together with the common electrode to form the light-shielding portions when a voltage is applied; and a plurality of first auxiliary electrodes provided on the other one of the substrates, the first driving electrodes and the first auxiliary electrodes being arranged alternately (first arrangement).

In the first arrangement, the device enters 2D display mode as a planar image (2D image) is displayed on the display panel when no parallax barrier is formed in the switch liquid crystal panel. The device enters 3D display mode as a stereoscopic image is displayed on the display panel when a parallax barrier is formed in the switch liquid crystal panel. The device enters mirror mode as a voltage is applied between the first driving electrodes and common electrode and between the first auxiliary electrodes and common electrode to cause light entering the device through the side closer to the viewer to be reflected by the reflective polarizer.

In the first arrangement, the device may be switched among 2D display mode, 3D display mode and mirror mode by switching between electrodes for voltage application when a voltage is applied to the liquid crystal layer of the switch liquid crystal panel.

In a second arrangement, starting from the first arrangement, a retardation of liquid crystal in the switch liquid crystal panel is set to a first minimum, and the liquid crystal in the switch liquid crystal panel has a dielectric constant anisotropy of 4 or greater. In the second arrangement, liquid crystal molecules can easily respond even in those portions of the liquid crystal layer of the switch liquid crystal panel that are located between the first driving electrodes and first auxiliary electrodes as viewed looking at the front side of the switch liquid crystal panel (inter-line regions). As such, the inter-line regions are also capable of changing the polarizing axis of light such that even light that has passed through an inter-line region is reflected by the reflective polarizer. In other words, the reflectivity associated with the inter-line regions may be improved.

In a third arrangement, starting from the first or second arrangement, the switch liquid crystal panel further includes alignment films each provided on a corresponding one of the substrates, and an orientation axis of the alignment films and a reference line extending in a longitudinal direction of the first driving electrodes form an angle of 35 degrees or larger. In the third arrangement, rubbing is insufficient at the boundary (i.e. a step portion) between a region with an electrode (first driving electrode or first auxiliary electrode) and a region without. Liquid crystal molecules in a region where rubbing is insufficient are instable and can easily respond even when an electric field is low such that the polarizing axis of light may be changed even in an inter-line region, thereby improving reflectivity.

In a fourth arrangement, starting from one of the first to third arrangements, an operating mode of liquid crystal in the switch liquid crystal panel is TN mode. In the fourth arrangement, the construction of the switch liquid crystal panel may be simplified.

In a fifth arrangement, starting from one of the first to fourth arrangements, the common electrode includes: a plurality of second driving electrodes provided on the one of the substrates; and a plurality of second auxiliary electrodes provided on the one of the substrates, the second driving electrodes and the second auxiliary electrodes being arranged alternately, the second driving electrodes and the second auxiliary electrodes being perpendicular to the first driving electrodes and the first auxiliary electrodes as viewed looking at a front side of the switch liquid crystal panel. In the fifth arrangement, stereoscopic display may be realized for landscape display or portrait display.

In a sixth arrangement, starting from one of the first to fifth arrangements, the display panel includes a plurality of pixels, the pixels being arranged in a matrix, a boundary portion being present between two adjacent pixels arranged in a first direction and extending in a second direction, where the first direction is a direction in which the light-shielding portions and the transparent portions are arranged alternately, and the second direction is a longitudinal direction of the light-shielding portions, and each of edges of each light-shielding portion disposed in the first direction has portions that cross a reference line extending in the second direction, each edge fluctuating in a specified cycle along the second direction. In the sixth arrangement, the edges of the boundary portions disposed in the first direction are non-parallel to the edges of the light-shielding portions disposed in the first direction. This will reduce moire occurring when the viewer is not at the optimum location for viewing stereoscopic images.

In a seventh arrangement, starting from one of the first to sixth arrangements, at least two first lines connected with some of the first driving electrodes and at least two second lines connected with some of the first auxiliary electrodes are included. In the seventh arrangement, a region for displaying images and a region that serves as a mirror may be defined on the display panel.

Now, more specific embodiments of the present invention will be described with reference to the drawings. The same or corresponding components in the drawings are labeled with the same characters and their description will not be repeated. For ease of explanation, the drawings to which reference will be made hereinafter show simplified or schematic representation, or do not show some components. The size ratios of the components shown in the drawings do not necessarily represent the actual size ratios.

First Embodiment

FIG. 1 shows a stereoscopic display device 10 of an embodiment of the present invention. The stereoscopic display device 10 includes a display panel 12, a switch liquid crystal panel 14, absorptive polarizers 16, 18 and 20, a reflective polarizer 22 and a backlight 24.

The display panel 12 is a liquid crystal panel. The display panel 12 includes an active-matrix substrate 26, a counter substrate 28 and a liquid crystal layer 30 enclosed between these substrates 26 and 28. In the display panel 12, any operating mode of liquid crystal may be used.

The display panel 12 includes a plurality of pixels. The pixels may be arranged in a matrix, for example. The region in which the pixels are provided forms the display region of the display panel 12.

Each pixel may include a plurality of sub-pixels. The sub-pixels may be, for example, a red sub-pixel, green sub-pixel and blue sub-pixel. The sub-pixels may further include sub-pixels of other colors.

In the display panel 12, columns of pixels for displaying an image to be seen by the right eye of the viewer (i.e. a right-eye image) and columns of pixels for displaying an image to be seen by the left eye of the viewer (i.e. a left-eye image) are alternately arranged in a horizontal direction of the display panel 12. In other words, each of the right- and left-eye images is divided into sub-images corresponding to the pixel columns (i.e. into stripes). Then, a composite image including these stripes of right- and left-eye images arranged alternately is displayed in the display region of the liquid crystal display panel 12.

Figure 2:
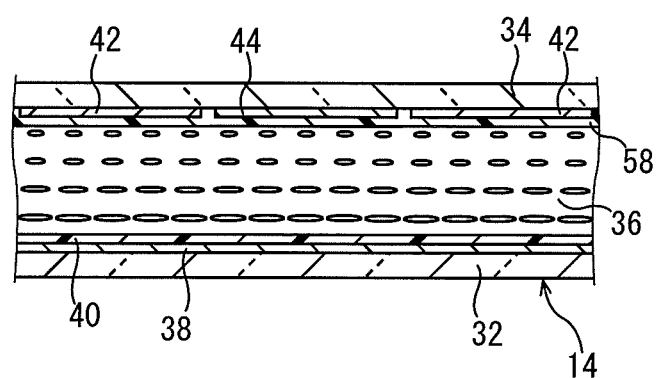
FIG. 2 is a schematic cross-sectional view of an example of a switch liquid crystal panel.

The switch liquid crystal panel 14 is located on one of the sides of the display panel 12 disposed in a thickness direction thereof. As shown in FIG. 2, the switch liquid crystal panel 14 includes a pair of substrates 32 and 34 and a liquid crystal layer 36.

The substrate 32 may be, for example, a low-alkali glass substrate. A common electrode 38 is provided on the substrate 32.

The common electrode 38 may be a transparent conductive film made of, for example, indium tin oxide (ITO). The common electrode 38 is provided substantially over an entire major surface of the substrate 32.

Figure 3:
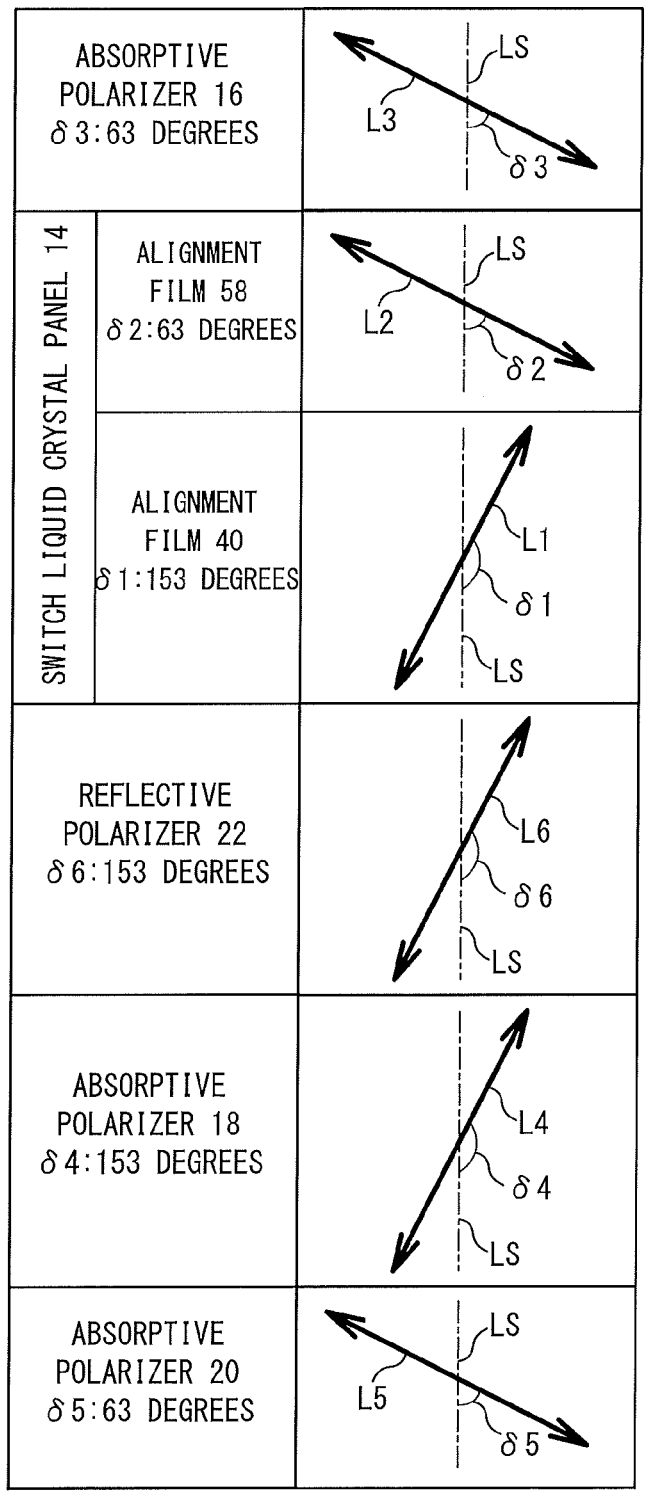
FIG. 3 illustrates the relationship between the rubbing axes of the alignment films, the transmission axes of the absorptive polarizers and the transmission axis of the reflective polarizer.

The common electrode 38 is covered with an alignment film 40. The alignment film 40 may be, for example, a polyimide resin film. As shown in FIG. 3, in the present embodiment, the rubbing axis of the alignment film 40, L1, and a reference line LS extending in an vertical direction of the display region of the display panel 12 (i.e. a vertical direction of the substrates 32 and 34) form an angle $\delta 1$ of 153 degrees.

Figure 4:
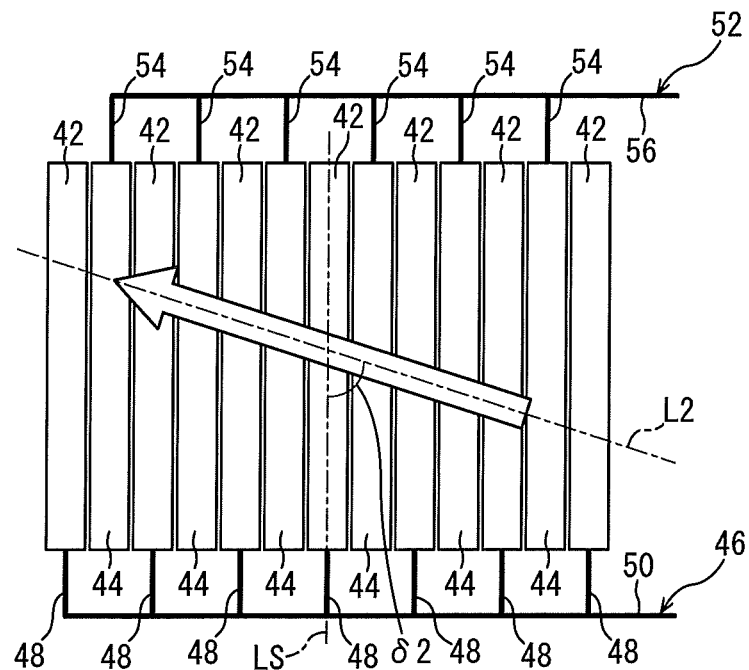
FIG. 4 is a plan view of driving electrodes and auxiliary electrodes provided on the other one of the substrates of the switch liquid crystal panel.

The substrate 34 may be, for example, a low-alkali glass substrate. On the substrate 34, as shown in FIG. 4, driving electrodes (first driving electrodes) 42 and auxiliary electrodes (first auxiliary electrodes) 44 are arranged alternately. The electrodes 42 and 44 may be, for example, transparent conductive films of indium tin oxide (ITO).

Each of the electrodes 42 and 44 extends in a vertical direction of the substrate 34 (i.e. a vertical direction of the display region of the display panel 12) with a generally constant width. In other words, the driving electrodes 42 and auxiliary electrodes 44 are alternately arranged in a horizontal direction of the substrate 44 (i.e. a horizontal direction of the display region of the display panel 12).

The driving electrodes 42 are electrically connected via a line system 46. This allows a voltage to be applied to the driving electrodes 42 simultaneously. The line system 46 includes connection lines 48 connected with the driving electrodes 42 and a coupling line 50 that couples the connection lines 48.

The auxiliary electrodes 44 are electrically connected via a line system 52. This allows a voltage to be applied to the auxiliary electrodes 44 simultaneously. The line system 52 includes connection lines 54 connected with the auxiliary electrodes 44 and a coupling line 56 that couples the connection lines 54.

The electrodes 42 and 44 are covered with an alignment film 58. The alignment film 58 may be, for example, a polyimide resin film. As shown in FIG. 3, the rubbing axis of the alignment film 58, L2, and the reference line LS form an angle $\delta 2$ in the range of 35 to 90 degrees, for example. In the present embodiment, the angle $\delta 2$ is 63 degrees.

The liquid crystal layer 36 is enclosed between the substrates 32 and 34. In the switch liquid crystal panel 14, the operating mode of the liquid crystal is TN mode.

The retardation ($\Delta n \cdot d$) of the liquid crystal layer 36 may be set to the first minimum, for example. First minimum means the first one of the minimums in a graph showing retardation in normally black mode versus transmittance to light. $\Delta n$ denotes refractive index anisotropy, which represents the difference between the refractive indices of the long axis and short axis of liquid crystal molecules. d denotes thickness of the liquid crystal layer 36, which represents cell gap.

The dielectric constant anisotropy $\Delta \in$ of the liquid crystal layer 36 may be 4 or greater, for example. Here, $\Delta \in$ is the difference between the dielectric constants of the long axis and short axis of liquid crystal molecules.

The absorptive polarizer 16 is located on one of the sides of the switch liquid crystal panel 14 disposed in a thickness direction thereof. As shown in FIG. 3, in the present embodiment, the transmission axis of the absorptive polarizer 16, L3, and the reference line LS form an angle $\delta 3$ of 63 degrees.

The absorptive polarizer 18 is located between the switch liquid crystal panel 14 and display panel 12. As shown in FIG. 3, in the present embodiment, the transmission axis of the absorptive polarizer 18, L4, and the reference line LS form an angle $\delta 4$ of 153 degrees.

The absorptive polarizer 20 is located on the other one of the sides of the display panel 12 disposed in a thickness direction thereof. As shown in FIG. 3, in the present embodiment, the transmission axis of the absorptive polarizer 20, L5, and the reference line LS form an angle $\delta 5$ of 63 degrees.

The reflective polarizer 22 is located between the switch liquid crystal panel 14 and absorptive polarizer 18. The reflective polarizer 22 may be, for example, a luminance improving film. The reflective polarizer 22 has a transmission axis L6 (see FIG. 3). The reflective polarizer 22 passes those components of light entering the reflective polarizer 22 that are parallel to the transmission axis L6 and reflects those light components that are perpendicular to the transmission axis L6. As shown in FIG. 3, the transmission axis of the reflective polarizer 22, L6, is parallel to the transmission axis L4 of the absorptive polarizer 18 and the rubbing axis L1 of the alignment film 40. The transmission axis L6 of the reflective polarizer 22 need not be exactly parallel to the transmission axis L4 and rubbing axis L1, and may be generally parallel thereto. The reflective polarizer 22 may be, for example, a film laminate including a plurality of thin films of dielectric material, a film laminate including a plurality of thin films with different refractive index anisotropies, or a film laminate including a cholesteric liquid crystal layer and a retardation film. The reflective polarizer may be, for example, a product of the DBEF series from 3M Company.

The reflective polarizer 22 may incorporate the absorptive polarizer 18. In such implementations, the reflective polarizer 22 and absorptive polarizer 18 may be treated as an integral component. The reflective polarizer 22 incorporating the absorptive polarizer 18 may be, for example, a polarizer with a luminance improving film from Nitto Denko Corporation (NIPOCS).

The backlight 24 is located backward with respect to the display panel 12 (on the side thereof opposite the side closer to the viewer). The backlight 24 illuminates the display region of the display panel 12. The backlight 24 may be an edge-lit backlight, for example. The light source of the backlight 24 may comprise light-emitting diodes, for example.

In the stereoscopic display device 10, the parallax barrier is formed in the switch liquid crystal panel 14. The parallax barrier 60 will be described with reference to FIG. 5.

When the parallax barrier 60 is to be formed, the driving electrodes 42 and the common electrode 38 may be caused to be at different potentials, while the auxiliary electrodes 44 and the common electrode 38 may be caused to be at the same potential. This changes the orientation of those liquid crystal molecules 62 that are located between the driving electrodes 42 and common electrode 38. Thus, those portions of the liquid crystal layer 36 located between the driving electrodes 42 and common electrode 38 function as light-shielding portions 64, while the portions between the light-shielding portions 64 function as transparent portions 66. As a result, the parallax barrier 60 is formed where the light-shielding portions 64 and transparent portions 66 are arranged alternately.

To form the parallax barrier 60 in the switch liquid crystal panel 14, voltages may be applied to the electrodes 38, 42 and 44 where the voltage applied to the driving electrodes 42 and the voltage applied to the common electrode 38 and auxiliary electrodes 44 are in opposite phases, or where a voltage is applied to the driving electrodes 42 while the common electrode 38 and auxiliary electrodes 44 are grounded, or where the driving electrodes 42 are grounded while a voltage is applied to the common electrode 38 and auxiliary electrodes 44. The voltage applied may have a rectangular wave with 5 volts, for example.

The stereoscopic display device 10 may be switched among 2D display mode, 3D display mode and mirror mode. These modes will be described below.

(1) 2D Display Mode

Figure 6:
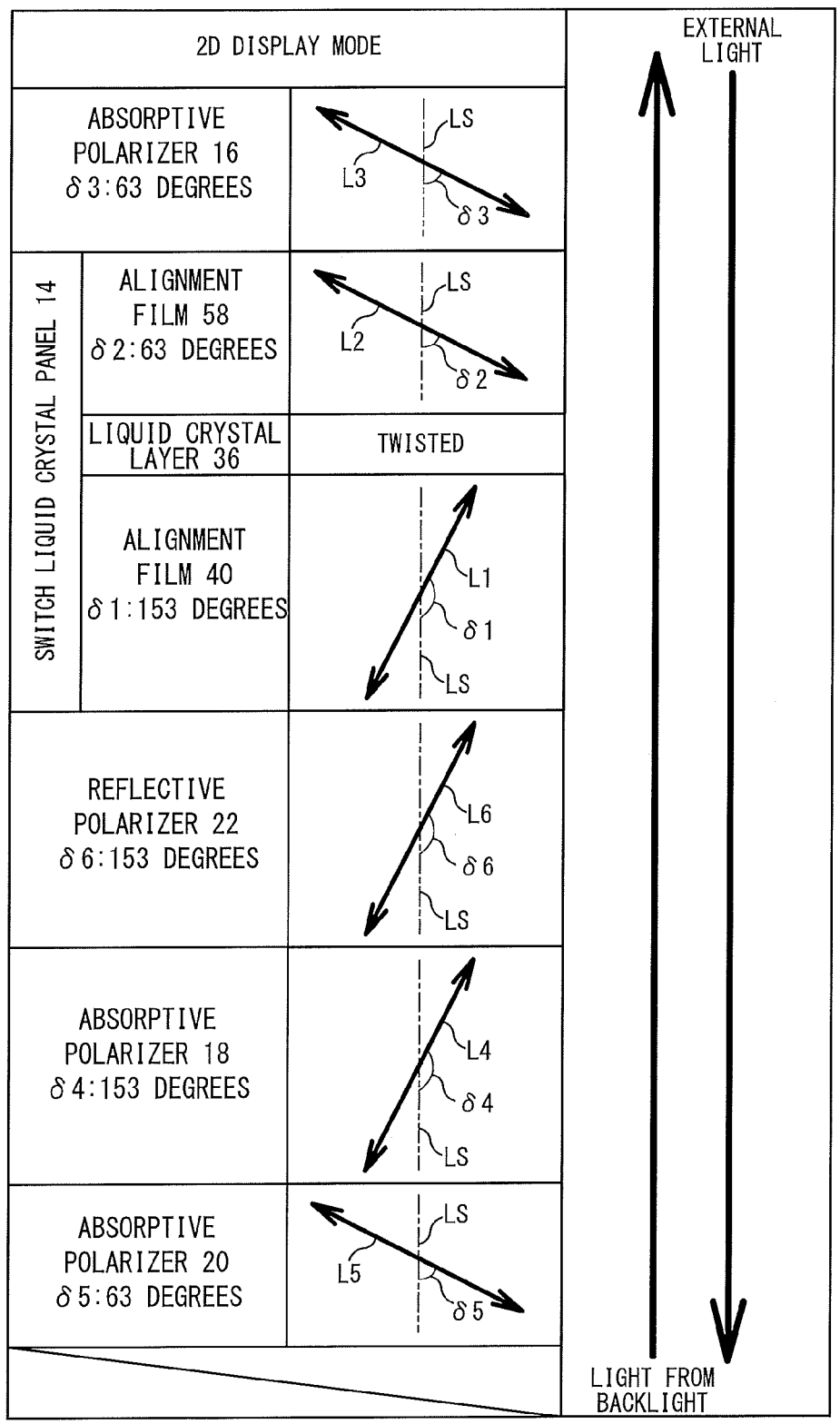
FIG. 6 illustrates how light advances when the stereoscopic display device is in 2D display mode.

FIG. 6 illustrates how light (light from the backlight and external light) advances when the stereoscopic display device 10 is in 2D display mode. In 2D display mode, the display panel 12 displays 2D images and the parallax barrier 60 is not formed in the switch liquid crystal panel 14.

(1.1) Switch Liquid Crystal Panel in 2D Display Mode

In 2D display mode, as shown in FIG. 2, no voltage is applied between the driving electrodes 42 and common electrode 38 or between the auxiliary electrodes 44 and common electrode 38. That is, the orientation of the liquid crystal molecules 62 in the liquid crystal layer 36 remains unchanged.

(1.2) How External Light Advances

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L2 of the alignment film 46 is parallel to the transmission axis L3 of the absorptive polarizer 16. In the switch liquid crystal panel 14, the operating mode of liquid crystal is TN mode and the orientation of the liquid crystal molecules 62 remains unchanged. In other words, in the switch liquid crystal panel 14, as shown in FIG. 2, the liquid crystal molecules 62 are twisted 90 degrees. Further, the rubbing axis L1 of the alignment film 40 is perpendicular to the rubbing axis L2 of the alignment film 46. Consequently, the polarizing axis of external light that has entered the switch liquid crystal panel 14 is rotated 90 degrees when the light passes through the switch liquid crystal panel 14.

The rubbing axis L1 of the alignment film 40 is parallel to the transmission axis L6 of the reflective polarizer 22. Consequently, external light that has passed through the switch liquid crystal panel 14 only has components parallel to the transmission axis L6 of the reflective polarizer 22. As such, external light that has passed through the switch liquid crystal panel 14 is not reflected by the reflective polarizer 22.

(1.3) How Light from Backlight Advances

Light from the backlight enters the absorptive polarizer 20. The absorptive polarizer 20 only passes those components of light from the backlight that are parallel to the transmission axis L5. Consequently, light from the backlight entering the display panel 12 only has components parallel to the transmission axis L5.

An implementation where the display panel 12 is a liquid crystal panel, for example, and the operating mode of the liquid crystal is normally white TN mode will be considered. When this display panel 12 is to display white, for example, the liquid crystal molecules of the liquid crystal layer 30 of the display panel 12 are twisted 90 degrees. Consequently, light from the backlight that has passed through the display panel 12 only has components parallel to the transmission axis L4 of the absorptive polarizer 18. Thus, light from the backlight that has passed through the display panel 12 passes through the absorptive polarizer 18.

Light from the backlight that has passed through the absorptive polarizer 18 enters the reflective polarizer 22. The reflective polarizer 22 has the transmission axis L6, which is parallel to the transmission axis L4. Consequently, light from the backlight that has passed through the absorptive polarizer 18 passes through the reflective polarizer 22. Light from the backlight that has passed through the reflective polarizer 22 enters the switch liquid crystal panel 14. That is, light from the backlight entering the switch liquid crystal panel 14 only has components parallel to the transmission axis L6 of the reflective polarizer 22.

The rubbing axis L1 of the alignment film 40 is parallel to the transmission axis L6 of the reflective polarizer 22. In the switch liquid crystal panel 14, the operating mode of the liquid crystal is TN mode and the orientation of the liquid crystal molecules 62 remains unchanged. In other words, in the switch liquid crystal panel 14, as shown in FIG. 2, the liquid crystal molecules 62 are twisted 90 degrees. Further, the rubbing axis L2 of the alignment film 46 is perpendicular to the rubbing axis L1 of the alignment film 40. Consequently, the polarizing axis of light from the backlight that has entered the switch liquid crystal panel 14 is rotated 90 degrees when the light passes through the switch liquid crystal panel 14.

The transmission axis L3 of the absorptive polarizer 16 is parallel to the rubbing axis L2 of the alignment film 46. That is, light from the backlight that has passed through the switch liquid crystal panel 14 only has components parallel to the transmission axis L3 of the absorptive polarizer 16. As a result, light from the backlight that has passed through the switch liquid crystal panel 14 passes through the absorptive polarizer 16. This allows the viewer to see 2D images displayed by the display panel 12.

(2) 3D Display Mode

Figure 7:
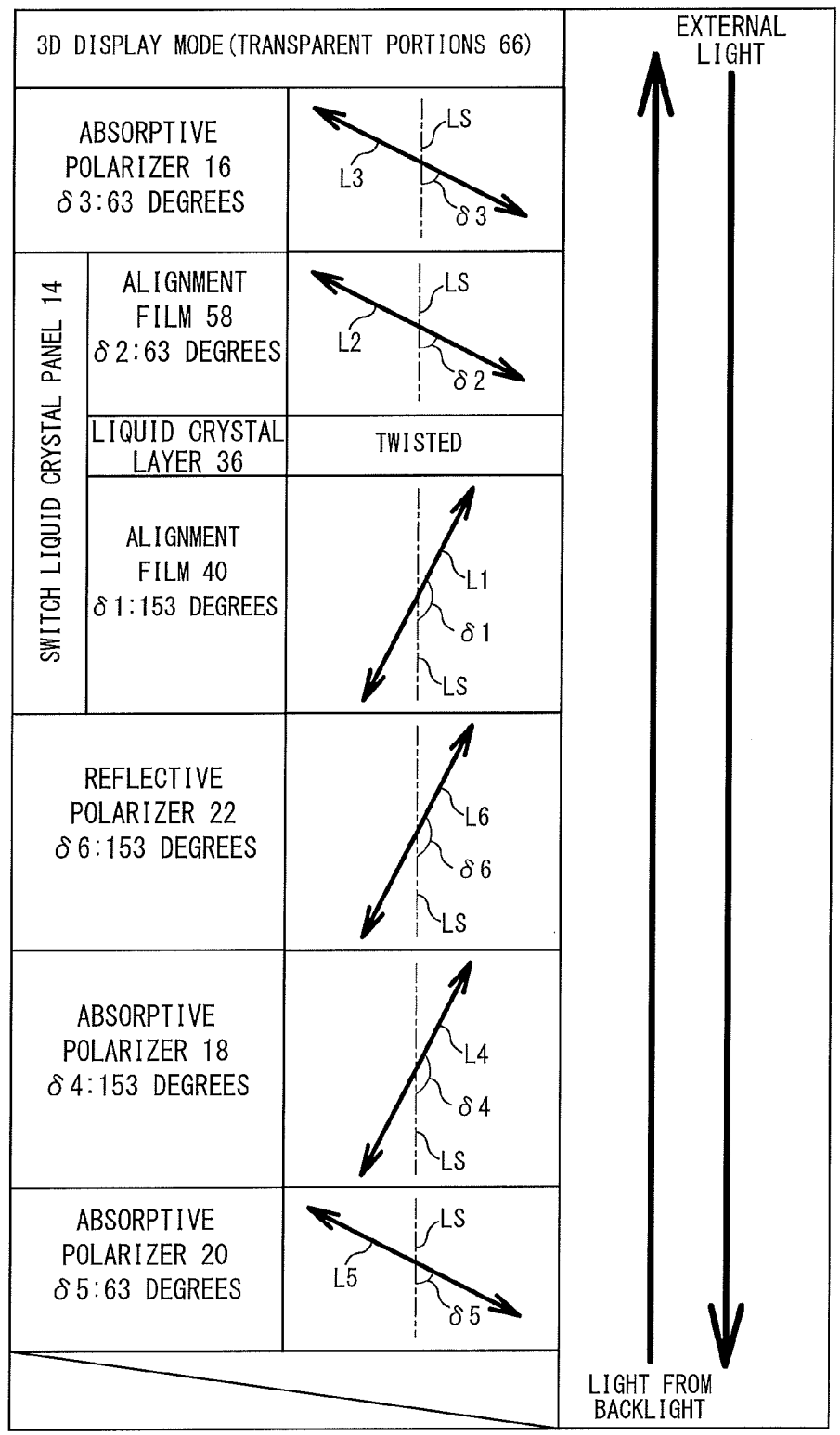
FIG. 7 illustrates how light advances through a transparent portion when the stereoscopic display device is in 3D display mode.
Figure 8:
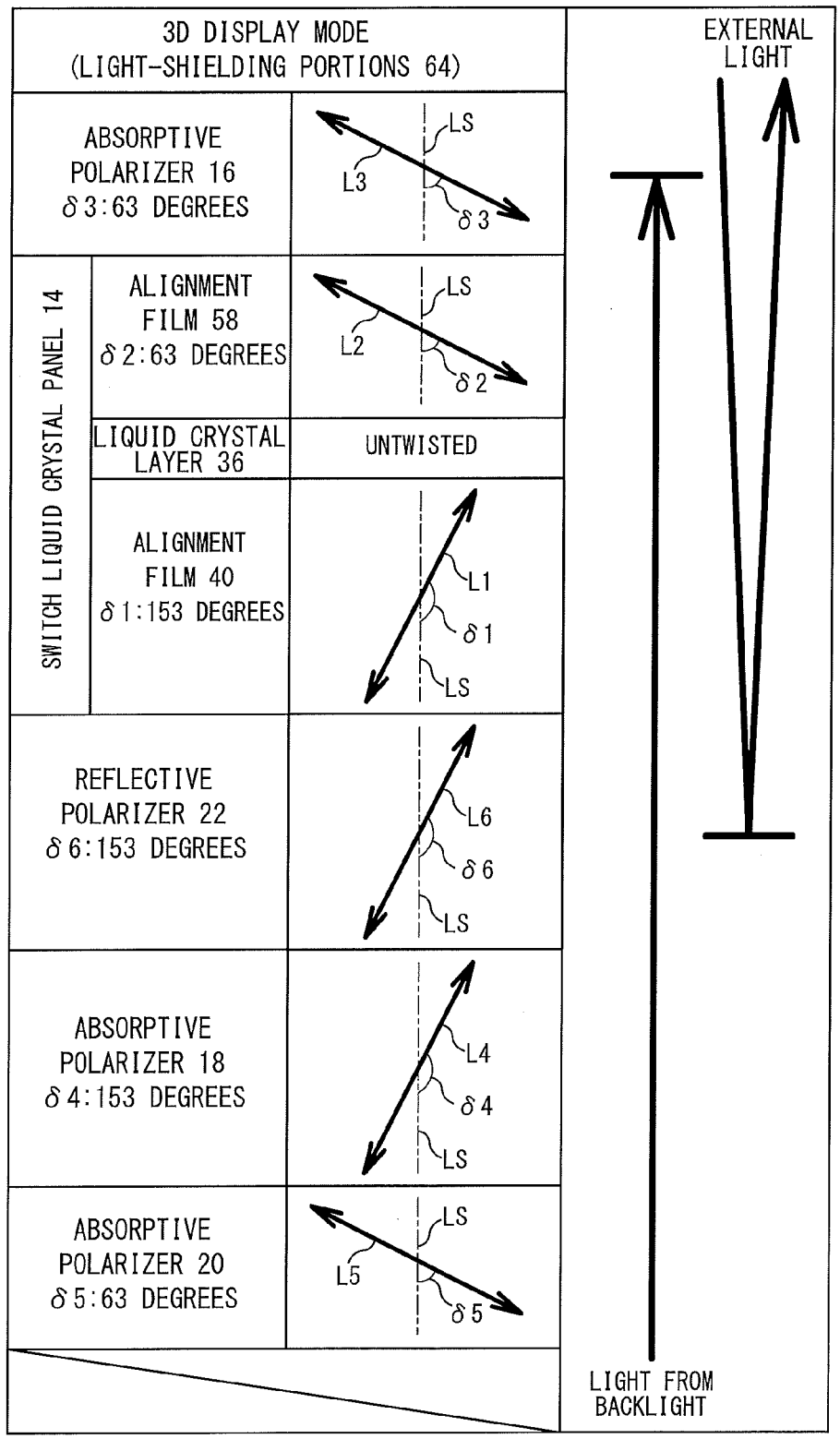
FIG. 8 illustrates how light advances through a light-shielding portion when the stereoscopic display device is in 3D display mode.

FIG. 7 illustrates how light (light from the backlight and external light) advances through a transparent portion 66 when the stereoscopic display device 10 is in 3D display mode. FIG. 8 illustrates how light (light from the backlight and external light) advances through a light-shielding portion 64 when the stereoscopic display device 10 is in 3D display mode. In 3D display mode, the display panel 12 displays stereoscopic images (left- and right-eye images) and the parallax barrier 60 is formed in the switch liquid crystal panel 14.

(2.1) Switch Liquid Crystal Panel in 3D Display Mode

Figure 5:
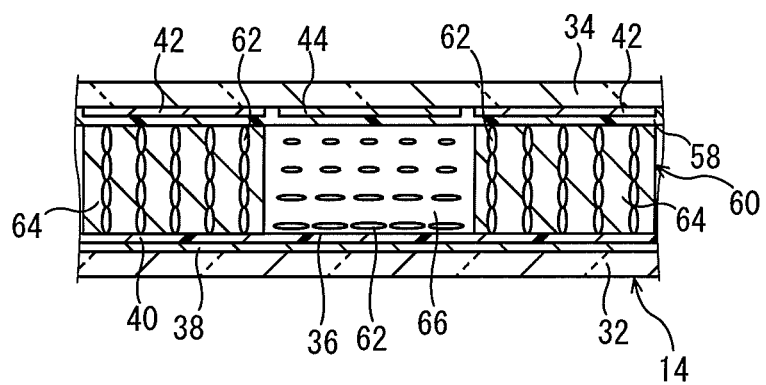
FIG. 5 is a cross-sectional view of the switch liquid crystal panel where a parallax barrier is formed.

In 3D display mode, as shown in FIG. 5, a voltage is applied between the driving electrodes 42 and common electrode 38 while no voltage is applied between the auxiliary electrodes 44 and common electrode 38. That is, the orientation of the liquid crystal molecules 62 in those portions of the liquid crystal layer 36 that are located between the driving electrodes 42 and common electrode 38 (i.e. the portions overlying the driving electrodes 42 as viewed looking at the front side of the switch liquid crystal panel 14) is changed, while the orientation of the liquid crystal molecules 62 in those portions of the layer located between the auxiliary electrodes 44 and common electrode 38 (i.e. the portions overlying the auxiliary electrodes 38 as viewed looking at the front side of the switch liquid crystal panel 14) remains unchanged. Those portions of the liquid crystal layer 36 that are located between the driving electrodes 42 and common electrode 38 serve as light-shielding portions 64, while the portions between light-shielding portions 64 serve as transparent portions 66.

(2.2) How External Light Advances

As shown in FIG. 5, the orientation of liquid crystal molecules 62 in a transparent portion 66 is different from that for a light-shielding portion 64. Thus, external light entering the switch liquid crystal panel 14 behaves differently depending on whether it passes through a transparent portion 66 or it passes through a light-shielding portion 64. A case of light passing through a transparent portion 66 and a case of light passing through a light-shielding portion 64 will be described below.

(2.2.1) External Light Passing through Transparent Portion

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L2 of the alignment film 46 is parallel to the transmission axis L3 of the absorptive polarizer 16. In a transparent portion 66, as shown in FIG. 5, liquid crystal molecules 62 are not standing upright. Further, the rubbing axis L1 of the alignment film 40 is perpendicular to the rubbing axis L2 of the alignment film 46. Consequently, the polarizing axis of external light that has entered the transparent portion 66 is rotated 90 degrees when the light passes through the switch liquid crystal panel 14.

The rubbing axis L1 of the alignment film 40 is parallel to the transmission axis L6 of the reflective polarizer 22. Consequently, external light that has passed through the transparent portion 66 only has components parallel to the transmission axis L6 of the reflective polarizer 22. As such, external light that has passed through the transparent portion 66 is not reflected by the reflective polarizer 22.

(2.2.2) External Light Passing through Light-Shielding Portion

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L2 of the alignment film 46 is parallel to the transmission axis L3 of the absorptive polarizer 16. In a light-shielding portion 64, as shown in FIG. 5, liquid crystal molecules 62 are standing upright. Consequently, the polarizing axis of external light that has entered the light-shielding portion 64 is not rotated when the light passes through the switch liquid crystal panel 14. In other words, external light that has passed through the light-shielding portion 64 only has components parallel to the transmission axis L3 of the absorptive polarizer 16.

The transmission axis L3 of the absorptive polarizer 16 is perpendicular to the transmission axis L6 of the reflective polarizer 22. Consequently, external light that has passed through the light-shielding portion 64 is reflected by the reflective polarizer 22.

(2.3) How Light from Backlight Advances

Light from the backlight enters the absorptive polarizer 20. The absorptive polarizer 20 only passes those components of light from the backlight that are parallel to the transmission axis L5. Consequently, light from the backlight entering the display panel 12 only has components parallel to the transmission axis L5.

An implementation where the display panel 12 is a liquid crystal panel, for example, and the operating mode of the liquid crystal is normally white TN mode will be considered. When this display panel 12 is to display white, for example, the liquid crystal molecules of the liquid crystal layer 30 of the display panel 12 are twisted 90 degrees. Consequently, light from the backlight that has passed through the display panel 12 only has components parallel to the transmission axis L4 of the absorptive polarizer 18. Thus, light from the backlight that has passed through the display panel 12 passes through the absorptive polarizer 18.

Light from the backlight that has passed through the absorptive polarizer 18 enters the reflective polarizer 22. The reflective polarizer 22 has the transmission axis L6, which is parallel to the transmission axis L4. Consequently, light from the backlight that has passed through the absorptive polarizer 18 passes through the reflective polarizer 22. Light from the backlight that has passed through the reflective polarizer 22 enters the switch liquid crystal panel 14. That is, light from the backlight entering the switch liquid crystal panel 14 only has components parallel to the transmission axis L6 of the reflective polarizer 22.

As shown in FIG. 5, the orientation of liquid crystal molecules 62 in a transparent portion 66 is different from that for a light-shielding portion 64. Thus, light from the backlight entering the switch liquid crystal panel 14 behaves differently depending on whether it passes through a transparent portion 66 or it passes through a light-shielding portion 64. A case of light passing through a transparent portion 66 and a case of light passing through a light-shielding portion 64 will be described below.

(2.3.1) Light from Backlight Passing through Transparent Portion

The rubbing axis L1 of the alignment film 40 is parallel to the transmission axis L6 of the reflective polarizer 22. In a transparent portion 66, as shown in FIG. 5, the liquid crystal molecules 62 are not standing upright. Further, the rubbing axis L2 of the alignment film 46 is perpendicular to the rubbing axis L1 of the alignment film 40. Consequently, the polarizing axis of light from the backlight entering the transparent portion 66 is rotated 90 degrees when the light passes through the switch liquid crystal panel 14.

The transmission axis L3 of the absorptive polarizer 16 is parallel to the rubbing axis L2 of the alignment film 46. That is, light from the backlight that has passed through the switch liquid crystal panel 14 only has components parallel to the transmission axis L3 of the absorptive polarizer 16. As a result, light from the backlight that has passed through the switch liquid crystal panel 14 passes through the absorptive polarizer 16. That is, the transparent portions 66 allow the viewer to see stereoscopic images displayed by the display panel 12.

(2.3.2) Light from Backlight Passing through Light-Shielding Portion

The rubbing axis L1 of the alignment film 40 is parallel to the transmission axis L6 of the reflective polarizer 22. In a light-shielding portion 64, as shown in FIG. 5, liquid crystal molecules 62 are standing upright. Consequently, the polarizing axis of light from the backlight entering the light-shielding portion 64 is not rotated when the light passes through the switch liquid crystal panel 14. In other words, light from the backlight that has passed through the light-shielding portion 64 only has components perpendicular to the transmission axis L3 of the absorptive polarizer 16. Consequently, light from the backlight that has passed through the light-shielding portion 64 does not pass through the absorptive polarizer 16. That is, the light-shielding portions 64 prevent the viewer from seeing stereoscopic images displayed by the display panel 12.

The display panel 12 displays composite images each including separate stripe-shaped right- and left-eye images arranged alternately. At this time, if the parallax barrier 60 is formed in the switch liquid crystal panel 14, only the right-eye images reach the right eye of the viewer, and only the left-eye images reach the left eye of the viewer. As a result, the viewer can see 3D images without special glasses.

(3) Mirror Mode

Figure 9:
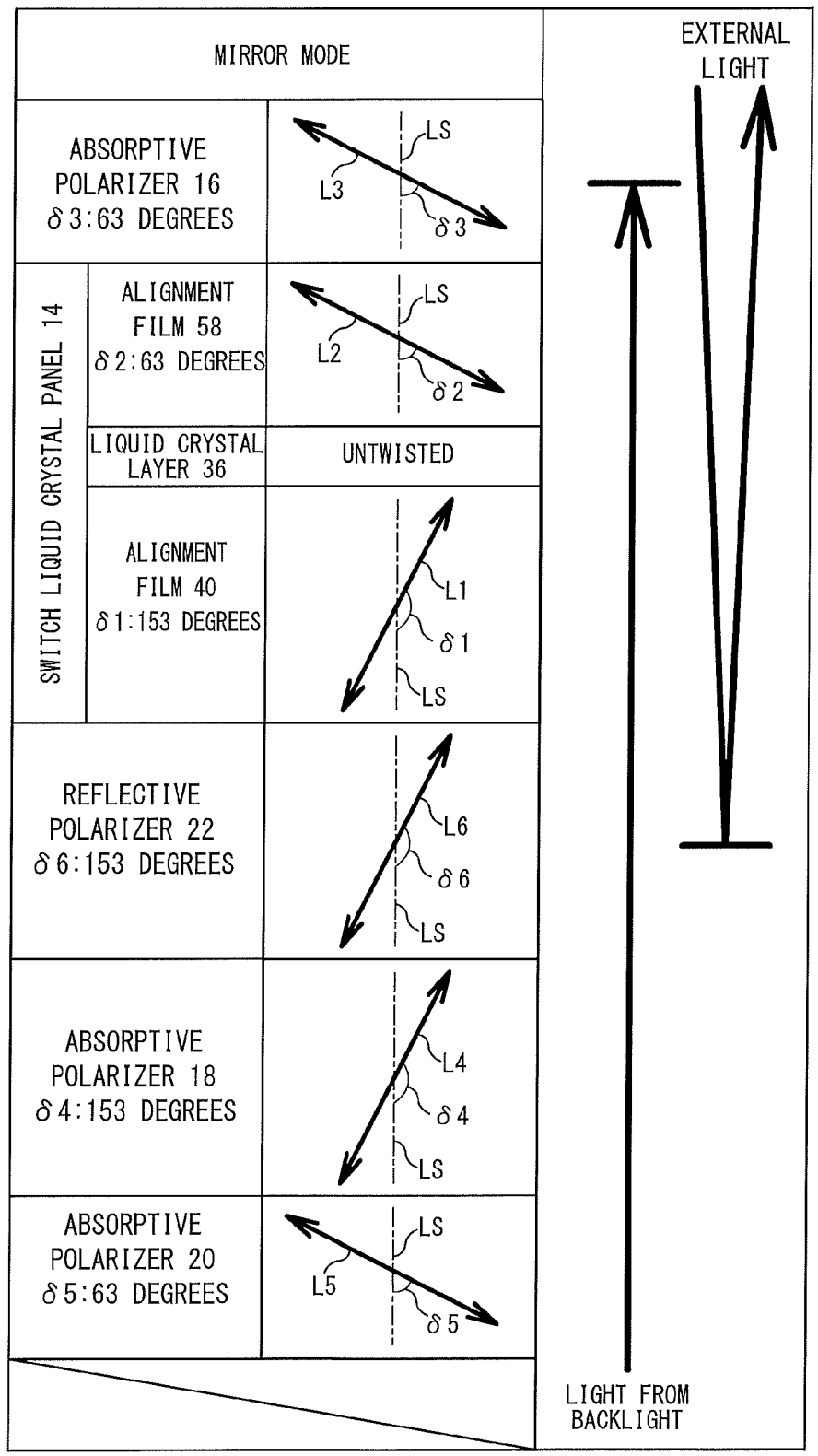
FIG. 9 illustrates how light advances when the stereoscopic display device is in mirror mode.

FIG. 9 illustrates how light (light from the backlight and external light) advances when the stereoscopic display device 10 is in mirror mode. In mirror mode, the stereoscopic display device 10 functions as a mirror.

(3.1) Switch Liquid Crystal Panel in Mirror Mode

In mirror mode, a voltage is applied between the driving electrodes 42 and common electrode 38 and between the auxiliary electrodes 44 and common electrode 38. That is, liquid crystal molecules 62 in the portions of the liquid crystal layer 36 that are located between the driving electrodes 42 and common electrode 38 and between the auxiliary electrodes 44 and common electrode 38 are standing upright. In other words, when viewed looking at the front side of the switch liquid crystal panel 14, light-shielding portions are formed not only in the portions of the panel that overlie the driving electrodes 42, but also in the portions of the panel that overlie the auxiliary electrodes 44.

(3.2) How Light from Backlight Advances

Light from the backlight enters the absorptive polarizer 20. The absorptive polarizer 20 only passes those components of light from the backlight that are parallel to the transmission axis L5. Consequently, light from the backlight entering the display panel 12 only has components parallel to the transmission axis L5.

An implementation where the display panel 12 is a liquid crystal panel, for example, and the operating mode of the liquid crystal is normally white TN mode will be considered. When this display panel 12 is to display white, for example, the liquid crystal molecules of the liquid crystal layer 30 of the display panel 12 are twisted 90 degrees. Consequently, light from the backlight that has passed through the display panel 12 only has components parallel to the transmission axis L4 of the absorptive polarizer 18. Thus, light from the backlight that has passed through the display panel 12 passes through the absorptive polarizer 18.

Light from the backlight that has passed through the absorptive polarizer 18 enters the reflective polarizer 22. The reflective polarizer 22 has the transmission axis L6, which is parallel to the transmission axis L4. Consequently, light from the backlight that has passed through the absorptive polarizer 18 passes through the reflective polarizer 22. Light from the backlight that has passed through the reflective polarizer 22 enters the switch liquid crystal panel 14. That is, light from the backlight entering the switch liquid crystal panel 14 only has components parallel to the transmission axis L6 of the reflective polarizer 22.

The rubbing axis L1 of the alignment film 40 is parallel to the transmission axis L6 of the reflective polarizer 22. In the switch liquid crystal panel 14, liquid crystal molecules 62 are standing upright. Consequently, the polarizing axis of light from the backlight that has entered the switch liquid crystal panel 14 is not rotated when the light passes through the switch liquid crystal panel 14. In other words, light from the backlight that has passed through the switch liquid crystal panel 14 only has components perpendicular to the transmission axis L3 of the absorptive polarizer 16. That is, light from the backlight that has passed through the switch liquid crystal panel 14 does not pass through the absorptive polarizer 16.

(3.3) How External Light Advances

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L2 of the alignment film 46 is parallel to the transmission axis L3 of the absorptive polarizer 16. In the switch liquid crystal panel 14, liquid crystal molecules 62 are standing upright. Consequently, the polarizing axis of external light entering the switch liquid crystal panel 14 is not rotated when the light passes through the switch liquid crystal panel 14. In other words, external light that has passed through the switch liquid crystal panel 14 only has components parallel to the transmission axis L3 of the absorptive polarizer 16.

The transmission axis L3 of the absorptive polarizer 16 is perpendicular to the transmission axis L6 of the reflective polarizer 22. Consequently, external light that has passed through the switch liquid crystal panel 14 is reflected by the reflective polarizer 22

In the switch liquid crystal panel 14, the retardation of the liquid crystal is set to the first minimum and the liquid crystal has a dielectric constant anisotropy equal to or greater than 4. Thus, liquid crystal molecules 62 can easily respond even in those portions of the liquid crystal layer 36 that are located between the driving electrodes 42 and auxiliary electrodes 44 (i.e. the inter-line regions) as viewed looking at the front side of the switch liquid crystal panel 14. As such, the inter-line regions are also capable of changing the polarizing axis of light such that even external light that has passed through an inter-line region is reflected by the reflective polarizer 22.

Reasons why external light that has passed through an inter-line region is reflected by the reflective polarizer 22 if the retardation Δn·d of the liquid crystal is set to the first minimum and the dielectric constant anisotropy Δ∈ of the liquid crystal is 4 or greater (hereinafter referred to as "favorable conditions") will be provided with reference to FIGS. 10 to 13.

Figure 10:
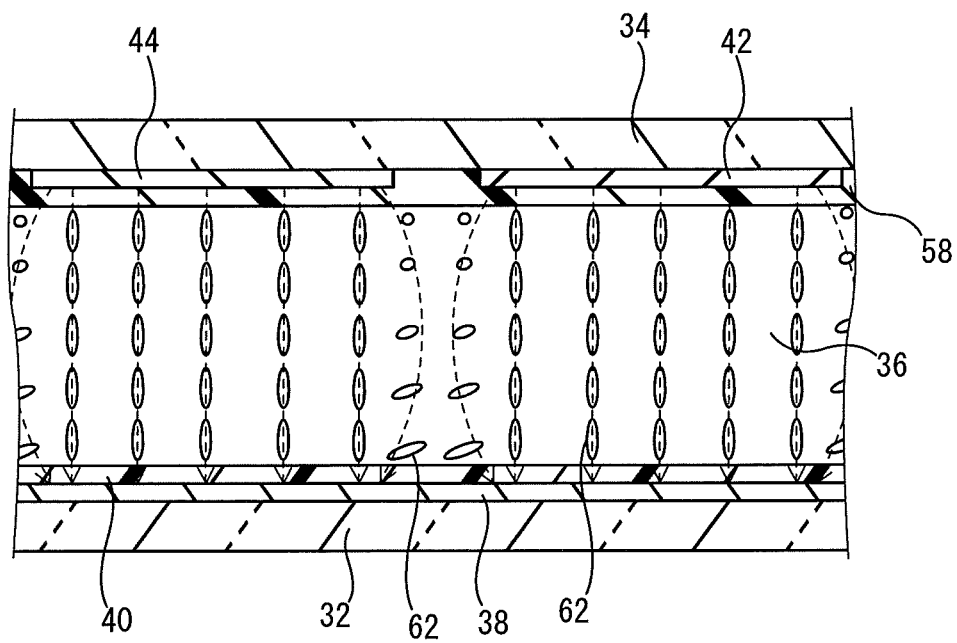
FIG. 10 schematically illustrates how liquid crystal molecules in an inter-line region are positioned when the favorable conditions are not met and the mirror mode is realized.
Figure 11:
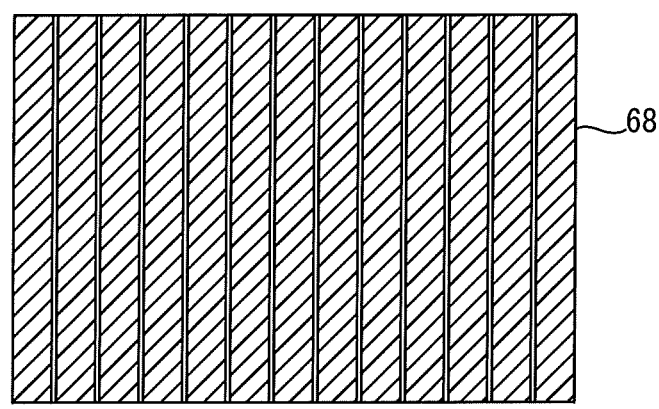
FIG. 11 is a model diagram illustrating what the mirror looks like when the device is in the state shown in FIG. 10.

If the liquid crystal does not meet the favorable conditions, liquid crystal molecules 62 in the inter-line regions are not easily affected by an electric field. Thus, as shown in FIG. 10, the orientations of liquid crystal molecules 62 in an inter-line region are significantly different from the orientation of liquid crystal molecules 62 located between the driving electrode 42 and common electrode 38 and between the auxiliary electrode 44 and common electrode 38. As such, light that has passed through the inter-line region is not easily reflected by the reflective polarizer 22. In other words, the reflectivity of the portions of the mirror that correspond to the inter-line regions decreases. FIG. 11 is a model diagram illustrating what the mirror 68 looks like at this time. For ease of understanding, FIG. 11 shows a mirror 68 divided into strips arranged in a horizontal direction; in reality, the separating portions (i.e. the inter-line regions) have a decreased reflectivity than the rest of the mirror.

Figure 12:
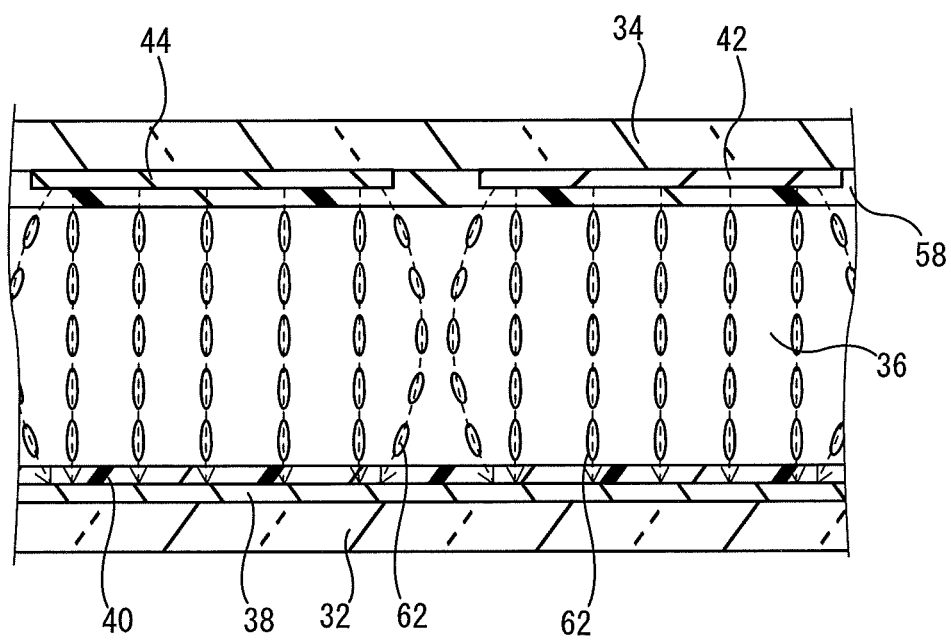
FIG. 12 schematically illustrates how liquid crystal molecules in an inter-line region are positioned when the favorable conditions are met and the mirror mode is realized.
Figure 13:
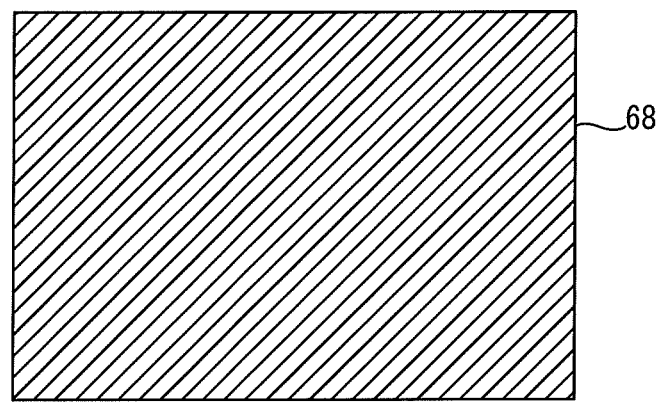
FIG. 13 is a model diagram illustrating what the mirror looks like when the device is in the state shown in FIG. 12.

On the other hand, if the liquid crystal meets the favorable conditions, liquid crystal molecules 62 in the inter-line regions can easily be affected by an electric field. Thus, as shown in FIG. 12, the orientations of liquid crystal molecules in an inter-line region are relatively similar to the orientation of liquid crystal molecules 62 located between the driving electrode 42 and common electrode 38 and between the auxiliary electrode 44 and common electrode 38. Thus, the region where light can be reflected can be extended to the portions of the mirror 68 that correspond to the inter-line regions. In other words, the reflectivity of the portions of the mirror 68 that correspond to the inter-line regions is improved. FIG. 13 is a model diagram illustrating what the mirror 68 looks like at this time. For ease of understanding, FIG. 13 shows a mirror without the separating portions shown in FIG. 11; in reality, the separating portions shown in FIG. 11 need not be completely eliminated.

Thus, the stereoscopic display device 10 may be switched among 2D display mode, 3D display mode and mirror mode. This will give the stereoscopic display device 10 further additional values.

Second Embodiment

Figure 14:
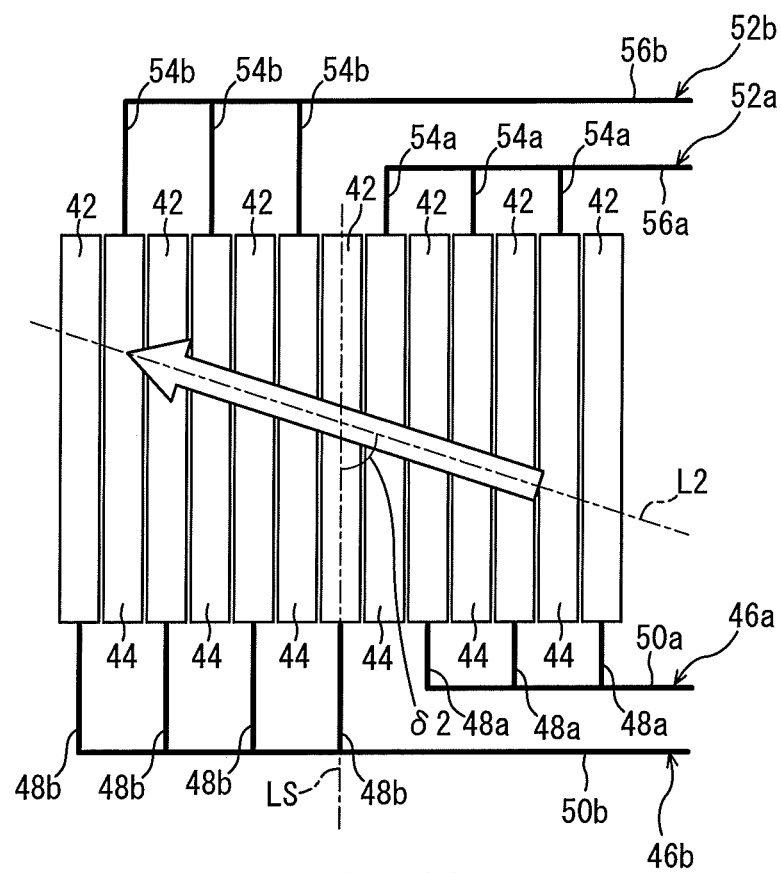
FIG. 14 is a plan view of a device of a second embodiment, showing lines connected with driving electrodes and auxiliary electrodes.

In the present embodiment, as shown in FIG. 14, one group of driving electrodes 42 have a line system (first line system) 46a connected thereto, and the other group of driving electrodes 42 have a line system (second line system) 46b connected thereto. This allows different voltages to be applied to the group of driving electrodes 42 connected to the line system 46a and the group of driving electrodes 42 connected to the line system 46b. The line system 46a includes connection lines 48a connected with the respective driving electrodes 42 and a coupling line 50a that couples these connection lines 48a. The line system 46b includes connection lines 48b connected with the respective driving electrodes 42 and a coupling line 50b that couples these connection lines 48b.

In the present embodiment, as shown in FIG. 14, one group of auxiliary electrodes 44 have a line system (third line system) 52a connected thereto, and the other group of auxiliary electrodes 44 have a line system (fourth line system) 52b connected thereto. This allows different voltages to be applied to the group of auxiliary electrodes 44 connected to the line system 52a and the group of auxiliary electrodes 44 connected to the line system 52b. The line system 52a includes connection lines 54a connected with the respective auxiliary electrodes 44 and a coupling line 56a that couples these connection lines 54a. The line system 52b includes connection lines 54b connected with the respective auxiliary electrodes 44 and a coupling line 56b that couples these connection lines 54b.

Figure 15:
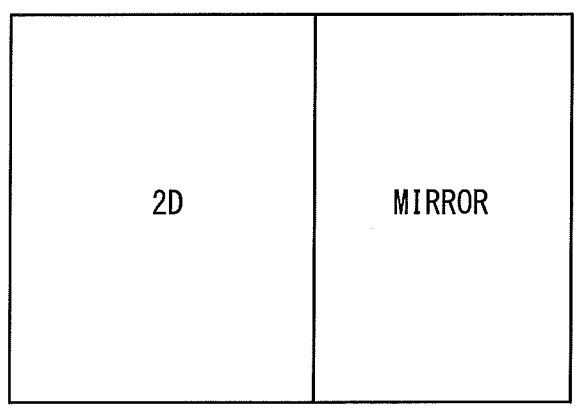
FIG. 15 is a plan view of the stereoscopic display device of the second embodiment, showing an example of a use situation.
Figure 16:
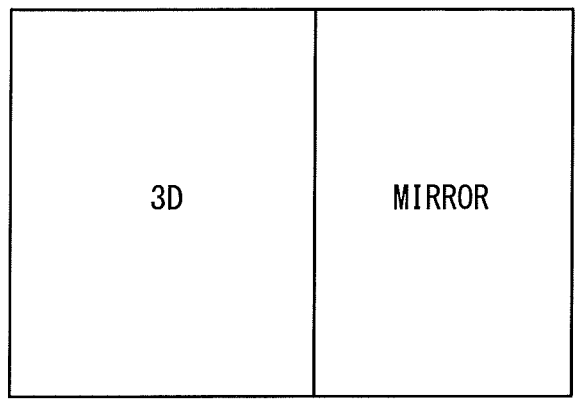
FIG. 16 is a plan view of the stereoscopic display device of the second embodiment, showing another example of a use situation.

In the present embodiment, a 2D display region 70 and a mirror 68 may be formed at the same time, as shown in FIG. 15, or a 3D display region 72 and a mirror 68 may be formed at the same time, as shown in FIG. 16.

Third Embodiment

Figure 17:
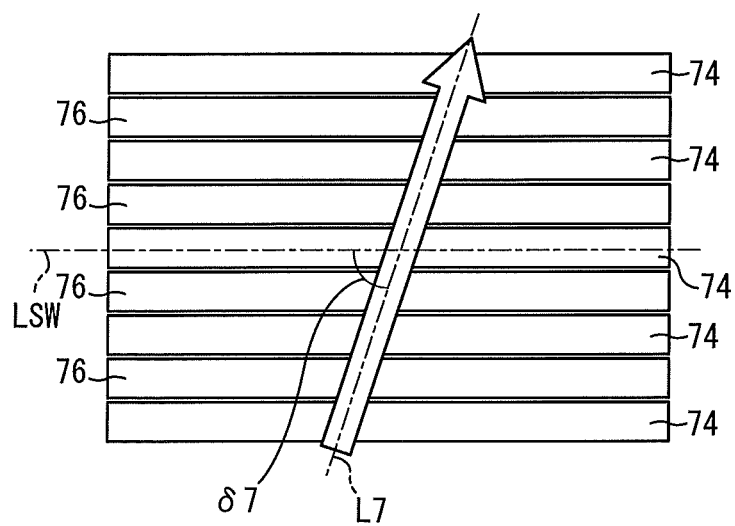
FIG. 17 is a plan view of driving electrodes and auxiliary electrodes provided on one of the substrates of a switch liquid crystal panel of a third embodiment.

In the present embodiment, the common electrode 38 is not provided on the substrate 32. Instead, as shown in FIG. 17, driving electrodes (second driving electrodes) 74 and auxiliary electrodes (second auxiliary electrodes) 76 are arranged alternately. The electrodes 74 and 76 may be, for example, transparent conductive films of indium tin oxide (ITO).

Each of the electrodes 74 and 76 extends in a horizontal direction of the substrate 32 (i.e. a horizontal direction of the display region of the display panel 12) with a generally constant width. In other words, the driving electrodes 74 and auxiliary electrodes 76 are alternately arranged in a vertical direction of the substrate 32 (i.e. a vertical direction of the display region of the display panel 12).

As shown in FIG. 17, the rubbing axis L1 of the alignment film 40 and a reference line LSW extending in a longitudinal direction of the electrodes 74 and 76 (i.e. a horizontal direction of the display region of the display panel 12) may form an angle δ7 in the range of 35 to 90 degrees, for example. In the present embodiment, the angle δ7 is 63 degrees.

Figure 18:
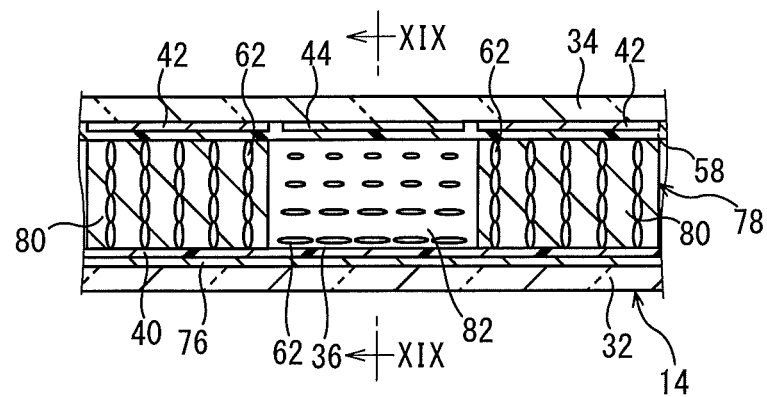
FIG. 18 is a cross-sectional view of the switch liquid crystal panel where a parallax barrier is formed.

In the present embodiment, two different parallax barriers may be formed in the switch liquid crystal panel 14. A parallax barrier 78 will be described with reference to FIG. 18. The parallax barrier 78 may be formed by causing the auxiliary electrodes 44, driving electrodes 74 and auxiliary electrodes 76 to be at the same potential (0 volts, for example) and causing the driving electrodes 42 to be at a potential different from that of the electrodes 44, 74 and 76 (5 volts, for example). This changes the orientation of liquid crystal molecules 62 located between the driving electrodes 42 and the common electrode (i.e. the driving electrodes 74 and auxiliary electrodes 76). Thus, those portions of the liquid crystal layer 36 that are located between the driving electrodes 42 and the common electrode (i.e. the driving electrodes 74 and auxiliary electrodes 76) function as light-shielding portions 80, while the portions between the light-shielding portions 80 function as transparent portions 82. As a result, the parallax barrier 78 including light-shielding portions 80 and transparent portions 82 arranged alternately is formed. The light-shielding portions 80 and transparent portions 82 are alternately arranged in a horizontal direction of the display region of the display panel 12.

Figure 19:
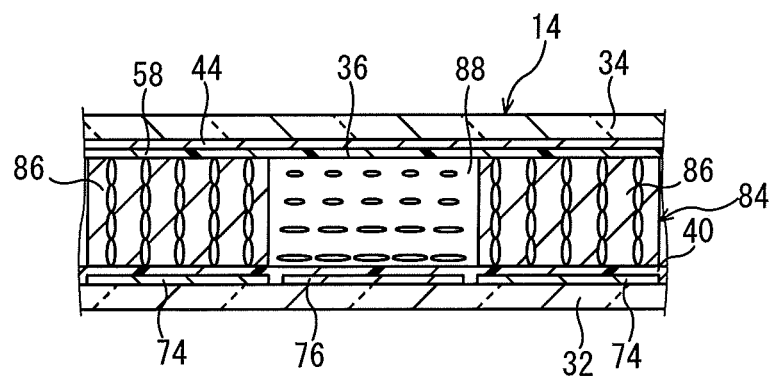
FIG. 19 is a cross-sectional view of the switch liquid crystal panel where another parallax barrier is formed.

In the present embodiment, in addition to the parallax barrier 78, a parallax barrier 84 may be formed in the switch liquid crystal panel 14. The parallax barrier 84 will be described with reference to FIG. 19. The parallax barrier 84 may be formed by causing the driving electrodes 42, auxiliary electrodes 44 and auxiliary electrodes 76 to be at the same potential (0 volts, for example) and causing the driving electrodes 74 to be at a potential different from that of the electrodes 42, 44 and 76 (5 volts, for example). This changes the orientation of liquid crystal molecules 62 located between the driving electrodes 74 and the common electrode (i.e. the driving electrodes 42 and auxiliary electrodes 44). Thus, those portions of the liquid crystal layer 36 that are located between the driving electrodes 74 and the common electrode (i.e. the driving electrodes 42 and auxiliary electrodes 44) function as light-shielding portions 86, while the portions between the light-shielding portions 86 function as transparent portions 88. As a result, the parallax barrier 84 including light-shielding portions 86 and transparent portions 88 arranged alternately is formed. The light-shielding portions 86 and transparent portions 88 are alternately arranged in a vertical direction of the display region of the display panel 12.

Fourth Embodiment

Figure 20:
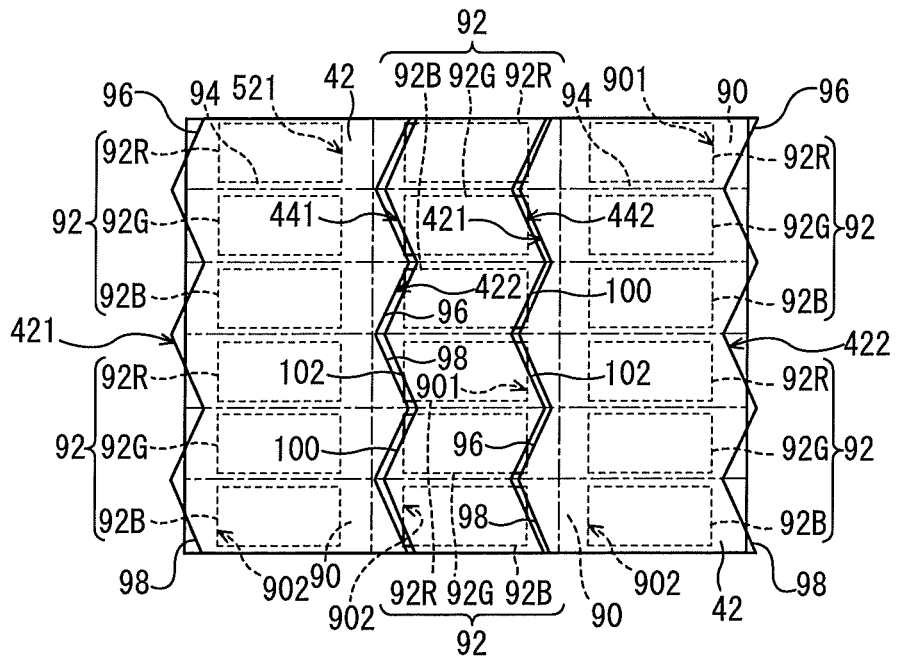
FIG. 20 is a plan view of a device of a fourth embodiment, showing the relationship between the edges of driving electrodes and the edges of boundary portions.

In the present embodiment, as shown in FIG. 20, the edges 421 and 422 of the driving electrodes 42 are non-parallel to the edges 901 and 902 of the boundary portions 90. In the following description, a horizontal direction of the display panel 12 will be referred to as first direction, while a vertical direction of the display panel 12 will be referred to as second direction.

As shown in FIG. 20, the display panel 12 has a plurality of pixels 92 arranged in a matrix. Each pixel 92 includes three sub-pixels 92R, 92G and 92B. The three sub-pixels 92R, 92G and 92B are arranged in the second direction (i.e. a vertical direction of the display panel 12).

A boundary portion 90 is provided between two adjacent columns of pixels 92 arranged in the first direction (i.e. a horizontal direction of the display panel 12). Boundary portions 90 may be part of a black matrix, for example.

Each boundary portion 90 extends in the second direction with a generally constant width. The edges 901 and 902 of the boundary portion 90 disposed in the first direction are straight lines extending in the second direction.

A boundary portion 94 is provided between two adjacent rows of sub-pixels arranged in the second direction. Boundary portions 94 may be part of a black matrix, for example. The boundary portions 90 and 94 are continuously formed.

Each of the edges 421 and 422 of a driving electrode 42 has a set of first inclined sides 96 and a set of second inclined sides 98.

Figure 21:
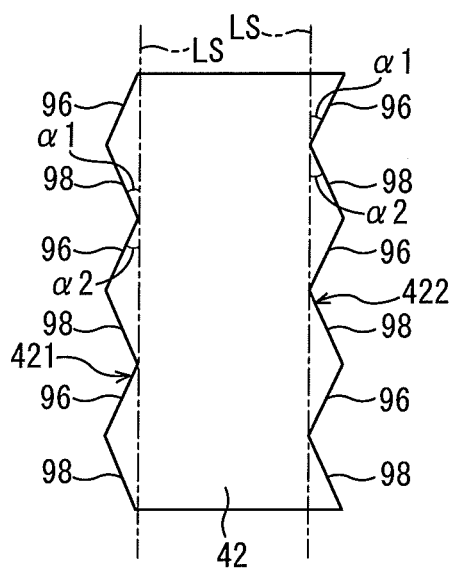
FIG. 21 is a plan view of a driving electrode.

As shown in FIG. 21, a first inclined side 96 is a straight line at an angle with a reference line LS extending in a second direction. The inclination angle α1 of the first inclined side 96 with respect to the reference line LS may be in the range of 5 to 20 degrees, for example. The size of the first inclined side 96 as measured in the second direction is equal to the pitch of the sub-pixels as measured in the second direction.

A second inclined side 98 is a straight line inclined in a different direction from that of the first inclined sides 96, with that of the reference line LS therebetween. The second inclined side 98 is inclined toward an opposite direction from that of the first inclined sides 96. The inclination angle α2 of the second inclined side 98 with respect to the reference line LS may be in the range of 5 to 20 degrees, for example. In the implementation shown in FIG. 21, the inclination angle α2 is equal to the inclination angle α1. The size of the second inclined side 98 as measured in the second direction is equal to the pitch of the sub-pixels as measured in the second direction.

The first and second inclined sides 96 and 98 are alternately arranged in the second direction. Thus, the edges 421 and 422 of the drive electrodes 42 fluctuate in a specified cycle along the second direction. Although the edges 421 and 422 of the drive electrodes 42 fluctuate in a specified cycle along the second direction, the electrodes are parallel to the reference line LS extending in the second direction from a macroscopic viewpoint.

While the edges 421 and 422 of a drive electrode 42 fluctuate cyclically along the second direction, the width of the drive electrode 42 (i.e. its size as measured in the first direction) is generally constant along the second direction. In other words, the size of the area between two adjacent drive electrodes 42 (i.e. the area corresponding to a transparent portion 66) is generally constant along the second direction. This prevents brightness from fluctuating along the second direction. Further, since each of the light-shielding portions 64 extends in the second direction with a generally constant width, the light-shielding properties of a conventional stripe-shaped parallax barrier are maintained.

The edges 441 and 442 of an auxiliary electrode 44 has a geometry analogous to that of the edges 421 and 422 of a driving electrode 42. That is, each of the edges 441 and 442 of an auxiliary electrode 44 disposed in the first direction has a set of first inclined sides 100 and a set of second inclined sides 102. The first and second inclined sides 100 and 102 are alternately arranged in the second direction. Thus, the edges 441 and 442 of the auxiliary electrodes 44 fluctuate in a specified cycle along the second direction. Although the edges 441 and 442 of the auxiliary electrodes 44 fluctuate in a specified cycle along the second direction, the electrodes are parallel to the reference line LS extending in the second direction from a macroscopic viewpoint.

In the present embodiment, the edges 901 and 902 of the boundary portions 90 and the edges 421 and 422 of the drive electrodes 42 are not parallel. This reduces moire visible to the viewer when the viewer is not at the optimum viewing position during 3D display.

It should be noted that the edges 421 and 422 of a driving electrode 42 need not fluctuate along the second direction in the cycle shown in FIGS. 20 and 21 (i.e. that with two sub-pixels), but may fluctuate in any cycle.

Further, each of the edges 421 and 422 of a driving electrode 42 may form a wave line extending in the second direction, for example. That is, each of the edges 421 and 422 of a driving electrode 42 may form any line that is non-parallel to the reference line LS extending in the second direction.

While embodiments of the present invention have been described in detail, they are merely illustrative examples and the present invention is not limited in any way to the above embodiments.

For example, in the first to fourth embodiments, the display panel 12 may be a plasma display panel, an organic electroluminescence (EL) panel, or an inorganic EL panel.

In the first to fourth embodiments, the rubbing axis L2 of the alignment film 58 may be perpendicular to the transmission axis L3 of the polarizer 16 and the rubbing axis L1 of the alignment film 40 may be perpendicular to the transmission axis L6 of the reflective polarizer 22.

The invention claimed is:

1. A stereoscopic display device comprising:
a display panel;
a switch liquid crystal panel located closer to a viewer than the display panel is;
a backlight located behind the display panel;
an absorptive polarizer located closer to the viewer than the switch liquid crystal panel is; and
a reflective polarizer located between the display panel and the switch liquid crystal panel, wherein
the display panel is capable of selectively displaying a planar image and a stereoscopic image,
the switch liquid crystal panel is capable of forming a parallax barrier having transparent portions and light-shielding portions arranged alternately,
the absorptive polarizer is capable of passing those components of light entering the absorptive polarizer that are parallel to a transmission axis of the absorptive polarizer while absorbing those components that are perpendicular to the transmission axis of the absorptive polarizer,
the reflective polarizer has a transmission axis perpendicular to the transmission axis of the absorptive polarizer and is capable of passing those components of light entering the reflective polarizer that are parallel to the transmission axis of the reflective polarizer while reflecting those components that are perpendicular to the transmission axis of the reflective polarizer,
the switch liquid crystal panel includes:
a pair of substrates;
a liquid crystal layer enclosed between the substrates;
a common electrode provided on one of the substrates;
a plurality of first driving electrodes provided on the other one of the substrates for working together with the common electrode to form the light-shielding portions when a voltage is applied; and
a plurality of first auxiliary electrodes provided on the other one of the substrates, the first driving electrodes and the first auxiliary electrodes being arranged alternately; wherein
in a 2D display mode, the plurality of first driving electrodes, the plurality of first auxiliary electrodes and the common electrode are caused to be at a same potential;
in a 3D display mode, the plurality of first driving electrodes are caused to be at a different potential from a potential of the common electrode, and the plurality of first auxiliary electrodes and the common electrode are caused to be at a same potential; and
in a mirror display mode in which the stereoscopic display device operates as a mirror, the plurality of first driving electrodes are caused to be at a different potential from a potential of the common electrode, and the plurality of first auxiliary electrodes are caused to be at a different potential from a potential of the common electrode.

2. The stereoscopic display device according to claim 1, wherein:
a retardation of liquid crystal in the switch liquid crystal panel is set to a first minimum, and
the liquid crystal in the switch liquid crystal panel has a dielectric constant anisotropy of 4 or greater.

3. The stereoscopic display device according to claim 1, wherein:
the switch liquid crystal panel further includes alignment films each provided on a corresponding one of the substrates; and
an orientation axis of the alignment films and a reference line extending in a longitudinal direction of the first driving electrodes form an angle of 35 degrees or larger.

4. The stereoscopic display device according to claim 1, wherein an operating mode of liquid crystal in the switch liquid crystal panel is TN mode.

5. The stereoscopic display device according to claim 1, wherein the common electrode includes:
a plurality of second driving electrodes provided on the one of the substrates; and
a plurality of second auxiliary electrodes provided on the one of the substrates, the second driving electrodes and the second auxiliary electrodes being arranged alternately,
the second driving electrodes and the second auxiliary electrodes being perpendicular to the first driving electrodes and the first auxiliary electrodes as viewed looking at a front side of the switch liquid crystal panel.

6. The stereoscopic display device according to claim 1, wherein:
the display panel includes a plurality of pixels,
the pixels being arranged in a matrix,
a boundary portion being present between two adjacent pixels arranged in a first direction and extending in a second direction,
where the first direction is a direction in which the light-shielding portions and the transparent portions are arranged alternately, and
the second direction is a longitudinal direction of the light-shielding portions; and
each of edges of each light-shielding portion disposed in the first direction has portions that cross a reference line extending in the second direction, each edge fluctuating in a specified cycle along the second direction.

7. The stereoscopic display device according to claim 1, further comprising:
at least two first lines connected with some of the first driving electrodes; and
at least two second lines connected with some of the first auxiliary electrodes.

* * * * *